United States Patent
Burke et al.

(10) Patent No.: US 12,291,065 B1
(45) Date of Patent: May 6, 2025

(54) RIDE-HEIGHT PASSIVE LOCKING MECHANISM

(71) Applicant: Schaeffler Technologies AG & Co. KG, Herzogenaurach (DE)

(72) Inventors: Peter Burke, Charlotte, NC (US); Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/486,296

(22) Filed: Oct. 13, 2023

(51) Int. Cl.
*B60G 17/005* (2006.01)
*B60G 15/06* (2006.01)
*B60G 17/015* (2006.01)

(52) U.S. Cl.
CPC ......... *B60G 17/005* (2013.01); *B60G 15/063* (2013.01); *B60G 17/0157* (2013.01); *B60G 2202/422* (2013.01); *B60G 2500/30* (2013.01)

(58) Field of Classification Search
CPC B60G 17/005; B60G 15/063; B60G 17/0157; B60G 2202/422; B60G 2202/25003
See application file for complete search history.

(56) References Cited

U.S. PATENT DOCUMENTS

| | | | | |
|---|---|---|---|---|
| 2,149,374 A | * | 3/1939 | Wellman | F16F 7/04 188/130 |
| 4,635,491 A | * | 1/1987 | Yamano | H02K 7/06 74/89.41 |
| 4,747,319 A | * | 5/1988 | Sakuta | F16H 25/20 74/89.41 |
| 6,009,668 A | * | 1/2000 | Reddy | E05F 15/652 49/362 |
| 8,839,937 B2 | * | 9/2014 | Hazama | F16H 63/3466 192/219.5 |
| 9,694,643 B2 | * | 7/2017 | Mersmann | B60G 17/005 |
| 10,883,446 B2 | * | 1/2021 | Werquin | F16H 25/2454 |
| 10,942,547 B2 | * | 3/2021 | Gault | E05B 65/0067 |
| 11,027,587 B2 | * | 6/2021 | Krehmer | B60G 17/02 |
| 11,173,766 B1 | * | 11/2021 | Hall | B60G 17/0164 |
| 11,199,245 B2 | * | 12/2021 | Kováč | F16H 1/20 |
| 11,199,249 B2 | * | 12/2021 | Holzberger | F16H 25/2454 |
| 2008/0274816 A1 | * | 11/2008 | McClellan | F16F 1/14 16/75 |

(Continued)

FOREIGN PATENT DOCUMENTS

FR 2034357 A1 12/1970

*Primary Examiner* — Timothy Wilhelm
(74) *Attorney, Agent, or Firm* — Volpe Koenig

(57) ABSTRACT

A vehicle ride-height adjustment device with a locking mechanism that has a simple control path and avoids the need for a separate actuator to control locking. The locking mechanism includes a locking gear coupled for rotation with a driven gear of a ride-height actuator, a locking pawl supported adjacent the driven gear for pivoting movement between a locked position engaged with a surface of the locking gear and restricting rotation thereof in at least one direction and a disengaged position spaced apart from the locking gear and permitting rotation of the driven gear. A shifting fork is coupled for rotation with the drive gear configured to move the locking pawl between engaged and disengaged positions. A torque limiter allows the shifting fork to rotate independent from the drive gear when a torque threshold is exceeded.

19 Claims, 3 Drawing Sheets

(56) References Cited

U.S. PATENT DOCUMENTS

2017/0299055 A1\* 10/2017 Tomita ................ F16H 63/3433
2020/0055361 A1\* 2/2020 Krehmer ................ B60G 17/02
2020/0370628 A1 11/2020 Sommerkorn et al.

\* cited by examiner

RIDE-HEIGHT PASSIVE LOCKING MECHANISM

TECHNICAL FIELD

The present disclosure is directed to vehicle ride-height adjustment systems, and is more particularly related to locking mechanism for a ride-height adjustment actuator.

BACKGROUND

Vehicle ride height adjustment systems are known. Such systems allow adjustment of the vehicle ride height for various purposes such as leveling the vehicle, increasing handling performance, and/or increasing ground clearance. One type of vehicle ride height adjustment system employs strut assemblies that include a device for adjusting a perch position of a coil over spring on damper. The perch position can be raised relative to a body of the damper to increase vehicle ride height, or lowered to relative to the body of the damper to lower the vehicle ride height. As unexpected changes in vehicle ride height are undesirable, various locking mechanisms are used to lock the selected ride height. Currently, ride height locking is achieved with either a passive device with a complex control path, or using a separate actuator to control locking.

With adjustable ride height capabilities becoming more common in road vehicles, a simple way to lock the selected ride height is needed.

SUMMARY

The present disclosure sets forth a ride height adjustment device with a locking mechanism that has a simple control path and avoids the need for a separate actuator to control locking.

In accordance with one aspect of the present disclosure, a locking mechanism is set forth for an associated rotary vehicle ride-height actuator having a drive gear and driven gear, the drive gear rotatable in a first direction to rotate the driven gear to raise vehicle ride-height and a second direction to rotate the driven gear to lower vehicle ride height. The locking mechanism comprises a locking gear coupled for rotation with the driven gear of the associated ride-height actuator, a locking pawl supported adjacent the driven gear for pivoting movement between a locked position engaged with a surface of the locking gear and restricting rotation thereof in at least the second direction and a disengaged position spaced apart from the locking gear and permitting rotation of the driven gear in at least the second direction, and a shifting fork coupled for rotation with the drive gear of the associated ride-height actuator. The shifting fork is coupled with the locking pawl and configured to move the locking pawl between the engaged position and the disengaged position based at least in part on a direction of rotation of the driven gear, and the shifting fork is coupled to the drive gear with a torque limiter that allows the shifting fork to rotate independent from the drive gear when a torque threshold is exceeded.

The torque limiter can include a friction washer interposed between a surface of the shifting fork and the drive gear. The shifting fork can include a slot, and the locking pawl can be received in the slot. The locking gear can include a plurality of asymmetrical teeth having a major side and a minor side, and the locking pawl can engage the minor side of a tooth in the locked position. The major side of a tooth can act as a cam surface to force the locking pawl to the disengaged position when the driving gear is rotated in the first direction. A torsion spring can be configured to bias the locking pawl towards the engaged position. A one-way clutch can be disposed between the shifting fork and the driven gear, the one-way clutch configured to freewheel when the drive gear is rotated in the first direction and to transmit torque from the drive gear to the shifting fork when the drive gear is rotated in the second direction. Actuation of the locking mechanism can be passive in response to rotation of the drive gear in the first and second directions.

In accordance with another aspect of the present disclosure, a rotary vehicle ride-height actuator comprises a drive gear, a driven gear coupled to the drive gear, a rotary to linear motion actuator coupled to the driven gear for increasing or decreasing the vehicle ride-height, and a locking mechanism for restricting decreasing the vehicle ride-height when engaged. The drive gear is rotatable in a first direction to rotate the driven gear to raise vehicle ride-height and a second direction to rotate the driven gear to lower vehicle ride height. The locking mechanism includes a locking gear coupled for rotation with the driven gear of the associated ride-height actuator, a locking pawl supported adjacent the driven gear for pivoting movement between a locked position engaged with a surface of the locking gear and restricting rotation thereof in response to rotation of the drive gear in the second direction and a disengaged position spaced apart from the locking gear and permitting rotation of the driven gear in response to rotation of the drive gear in the second direction, and a shifting fork coupled for rotation with the drive gear of the associated ride-height actuator. The shifting fork is coupled with the locking pawl and configured to move the locking pawl between the engaged position and the disengaged position based at least in part on a direction of rotation of the driven gear, and the shifting fork is coupled to the drive gear with a torque limiter that allows the shifting fork to rotate independent from the drive gear when a torque threshold is exceeded.

The torque limiter can include a friction washer interposed between a surface of the shifting fork and the drive gear. The shifting fork can include a slot, and the locking pawl can be received in the slot. The locking gear can include a plurality of asymmetrical teeth having a major side and a minor side, and wherein the locking pawl engages the minor side of a tooth in the locked position. The major side of a tooth can act as a cam surface to force the locking pawl to the disengaged position when the driving gear is rotated in the first direction. A torsion spring can be configured to bias the locking pawl towards the engaged position. A one-way clutch can be disposed between the shifting fork and the driven gear, the one-way clutch configured to freewheel when the drive gear is rotated in the first direction and to transmit torque from the drive gear to the shifting fork when the drive gear is rotated in the second direction.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
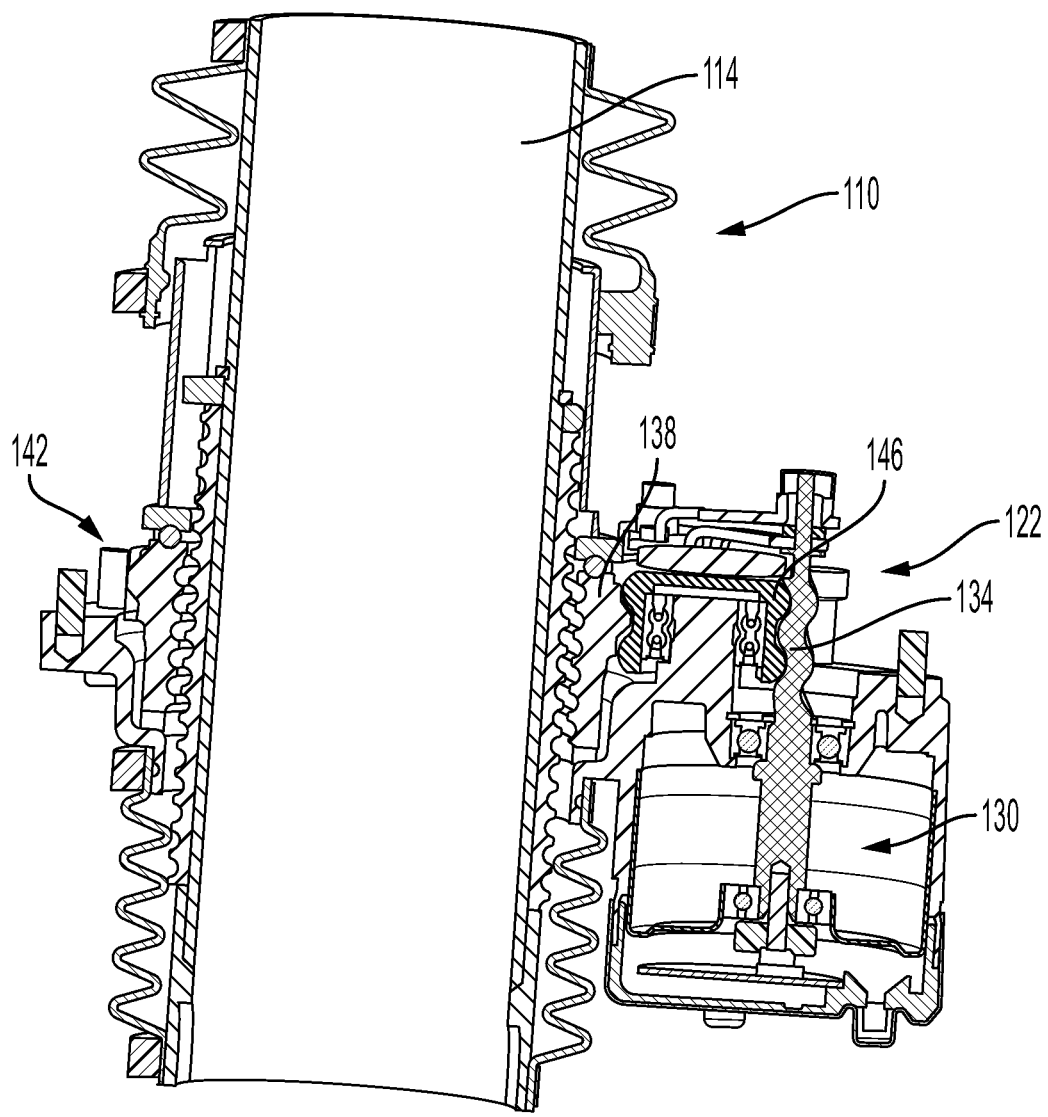
FIG. 1 is a cross-sectional view of an exemplary ride-height adjustment device including a locking mechanism in accordance with the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

In FIG. 1, an exemplary strut assembly in accordance with the present disclosure is illustrated and identified generally by reference numeral 110. The strut assembly 110 includes a damper 114. A ride height adjustment device 122 is mounted to the damper 114. As will become apparent, aspects of the present disclosure are applicable to a wide variety of ride height adjustment devices that utilize rotary actuators.

Figure 2:
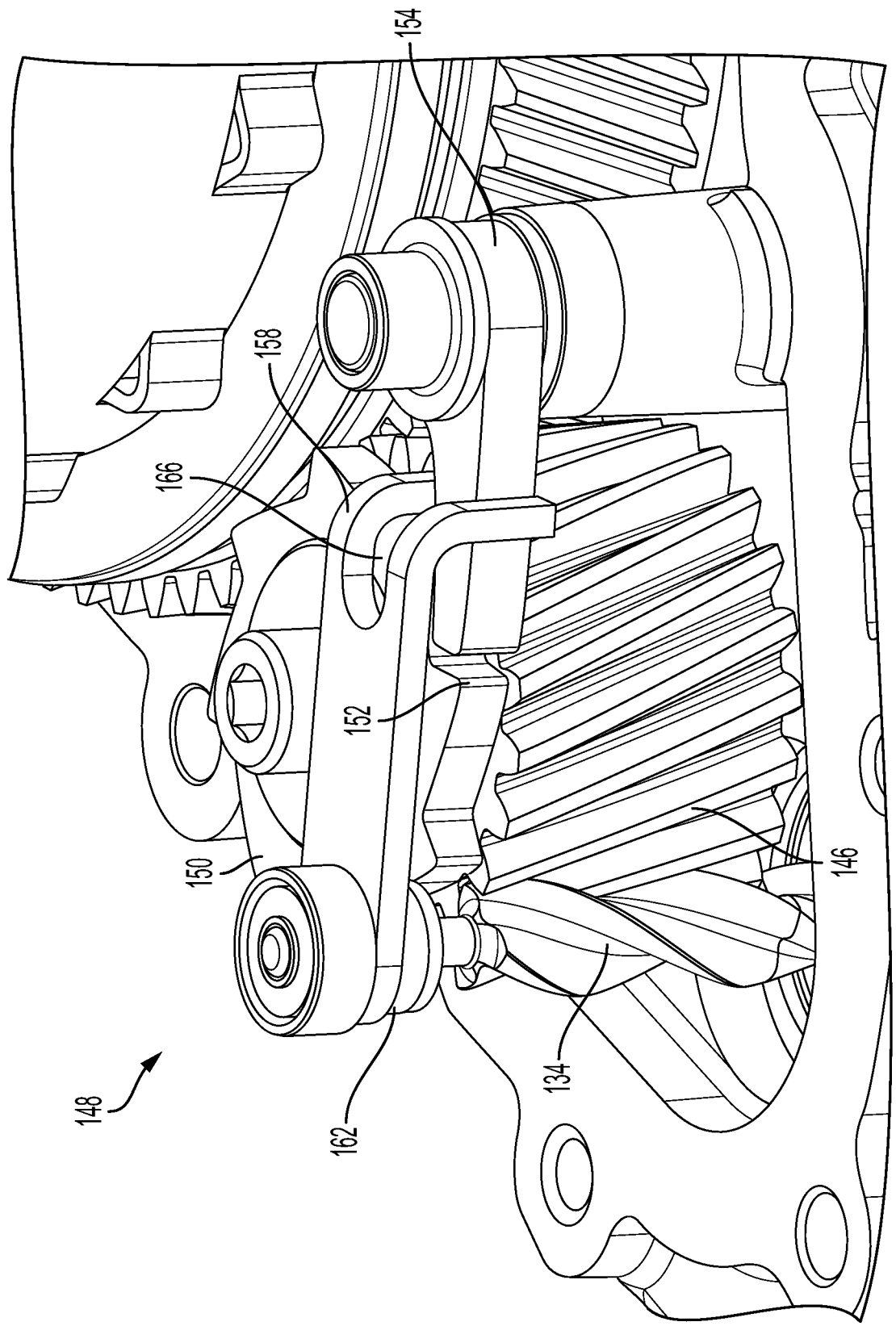
FIG. 2 is a perspective view of the locking mechanism of the ride-height adjustment device of FIG. 1 in an engaged (locked) configuration.

With additional reference to FIG. 2, the RHA device 122 includes a motor 130 configured to drive a pinion 134 (drive gear). The pinion is coupled to a nut 138 of a ball screw 142 via lifting (driven) gear 146. Rotation of the pinion 134 in a first direction results in rotation of the nut 138 and a raising of the vehicle ride height, while rotation of the pinion 134 in a direction opposite the first direction results in a lowering of vehicle ride height. In the illustrated embodiment, the number of teeth of the input gear is at least one and at most five, for example two or three. Further details of the RHA 122 are set forth in U.S. patent application Ser. No. 16/767,650 filed on May 28, 202, which is hereby incorporated by reference in its entirety.

The RHA device 122 includes a locking mechanism identified generally by reference numeral 148. The locking mechanism 148 includes a locking gear 150 having a plurality of teeth 152. The locking gear 150 in the illustrated example includes teeth 152 having major and minor sides Ma and Mi, respectively. The locking gear 150 is fixed for rotation with the lifting gear 146. A locking pawl 154 is supported adjacent the locking gear 150 for movement between an engaged position contacting a minor side Mi of a tooth 152 and restricting movement of the locking gear 150, and a disengaged position permitting movement of the locking gear 150. A shifting fork 158 is supported on the pinion 134 by a friction washer 162. The shifting fork 158 includes a slot 166 in which the locking pawl 154 is received. The friction washer 162 transmits a limited, but sufficient, amount of torque from the pinion 134 to the shifting fork 158 when the pinion 134 is rotated to move the locking pawl 154 between the engaged and disengaged positions.

To raise the vehicle ride height, the motor 130 rotates the pinion 134 counter-clockwise (when viewed from above in FIG. 2). Torque is applied to the shifting fork 158 through the friction washer 162, forcing the locking pawl 154 into engagement with the locking gear 150. Once the desired ride height is reached, the motor 130 is powered off and the locking pawl 154 will prevent reverse rotation of the locking gear 150 and the lifting gear 146.

To unlock the locking mechanism 148 and lower the vehicle ride height, the motor 130 rotates the pinion 134 counter-clockwise (when viewed from the above in FIG. 2) until the locking pawl 154 is aligned radially outwardly of a tip of the next tooth 152 in the locking gear 150. Movement of the locking pawl 154 to this position results from the major side Ma of a tooth 152 urging the locking pawl 154 radially outwardly during rotation of the lifting gear 146. The motor 130 then reverses and rotates the pinion 134 clockwise (when viewed from above in FIG. 2). Torque is applied to the shifting fork 158 through the friction washer 162 pulling the locking pawl 154 out of engagement with the locking gear 150. As the pinion 134 continues to rotate clockwise, the friction washer 162 will continue to apply torque in the same direction, causing the shifting fork 158 to maintain the locking pawl 154 in a disengaged position.

Figure 3:
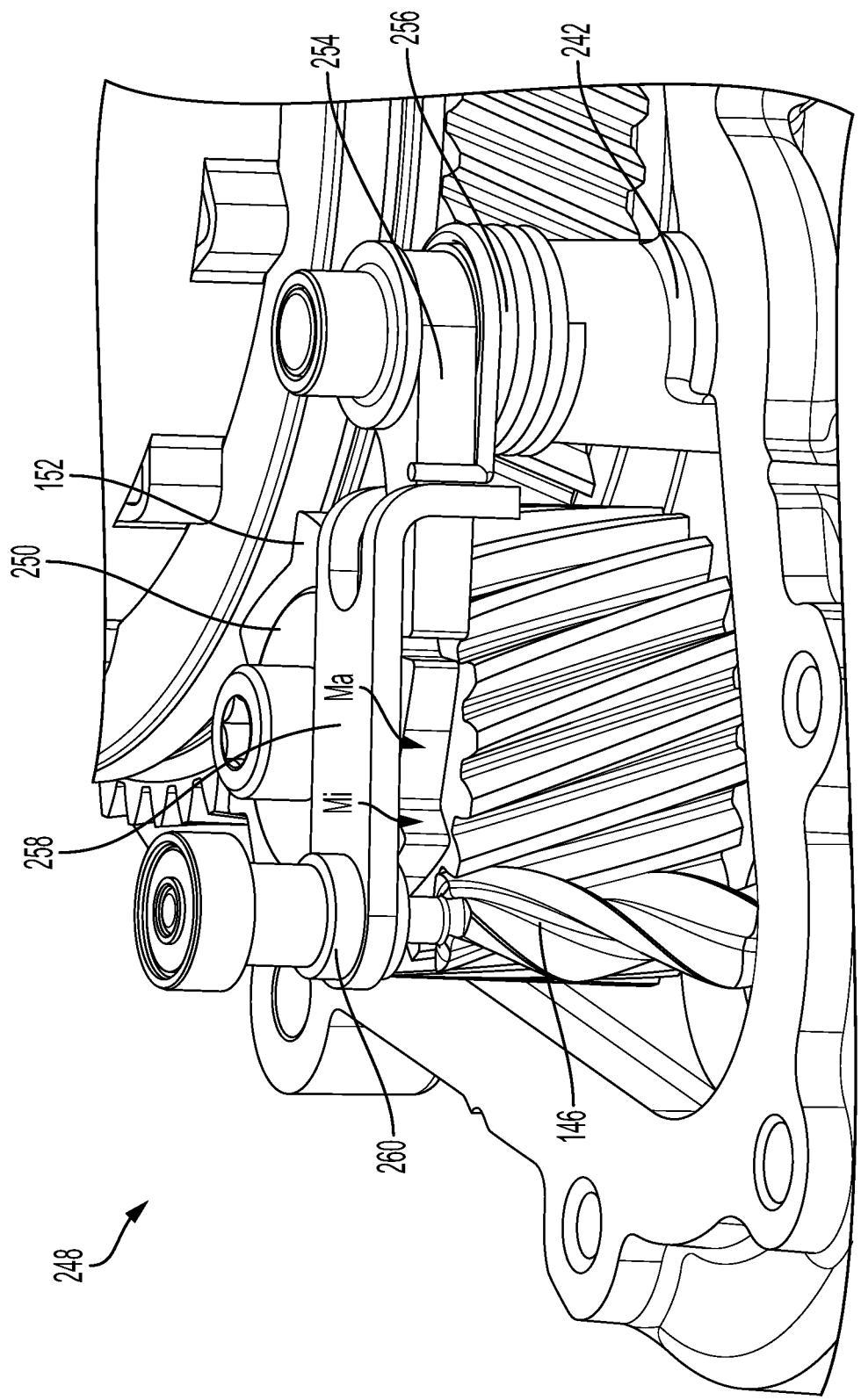
FIG. 3 is a perspective view of another example locking mechanism in accordance with the present disclosure in an engaged (locked) configuration.

Turning to FIG. 3, another exemplary locking mechanism in accordance with the present disclosure is identified generally by reference numeral 248. The locking mechanism 248 is similar to the locking mechanism 148 but includes additional features that enhance its operation and efficiency. In the following description, components common to each locking mechanism are given the same reference numerals and should be understood to have the same features. The locking mechanism 248 includes the locking gear 150, the locking pawl 154, the shifting fork 158, and the friction washer 162. The locking pawl 154 in this embodiment is biased towards the engaged position by a torsion spring 256. The shifting fork 158 is supported on the pinion 134 by a one-way clutch 260 and the friction washer 162. The one way clutch 260 couples the shifting fork 158 with the pinion 134 in a first rotational direction, and permits the pinion 134 to rotate independent of the shifting fork 158 in an opposite rotational direction. The friction washer 162 transmits a limited but sufficient amount of torque from the pinion 134 to the shifting fork 158 via the one way clutch 260 when the pinion 134 is rotated to move the locking pawl 154 between the engaged and disengaged positions.

To raise the vehicle ride height, the motor 130 rotates the pinion 134 counter-clockwise (when viewed from above in FIG. 4). The one-way clutch 260 allows pinion 134 to rotate independent of the shifting fork 158 while the torsion spring 256 forces the locking pawl 154 into engagement with the locking gear 150. Once the desired ride height is reached, the motor 130 is powered off and the locking pawl 154 will prevent reverse rotation of the locking gear 150 and the lifting gear 146. Due to the roller one-way clutch 260 there is reduced drag torque on the pinion 134, and increased efficiency.

To unlock the locking mechanism 248 and lower the vehicle ride height, the motor 130 rotates the pinion 134 counter-clockwise (when viewed from the above in FIG. 4) until the locking pawl 154 is aligned radially outwardly of a tip of the next tooth 152 in the locking gear 150. Movement of the locking pawl 154 to this position results from the tooth 152 urging the locking pawl 154 radially outwardly during rotation of the lifting gear 146. The motor 130 then reverses and rotates the pinion 134 clockwise (when viewed from above in FIG. 4). Torque is applied to the shifting fork 158 through the friction washer 162, pulling the locking pawl 154 out of engagement with the locking gear 150. As the pinion 134 continues to rotate clockwise, the friction washer 162 will continue to apply torque in the same direction, causing the shifting fork 158 to maintain the locking pawl 154 in a disengaged position.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

- 110 strut assembly
- 114 damper
- 122 ride-height adjustment device
- 130 motor
- 134 pinion
- 138 nut
- 142 ball screw
- 146 lifting gear
- 148 locking mechanism
- 150 locking gear
- 152 teeth
- 154 locking pawl
- 158 shifting fork
- 162 friction washer
- 166 slot
- 248 locking mechanism
- 256 torsion spring
- 260 one-way clutch
- Ma major side of tooth
- Mi minor side of tooth

What is claimed is:

1. A locking mechanism for an associated rotary vehicle ride-height actuator having a drive gear and driven gear, the drive gear rotatable in a first direction to rotate the driven gear to raise vehicle ride-height and a second direction to rotate the driven gear to lower vehicle ride height, the locking mechanism comprising:
    a locking gear coupled for rotation with the driven gear of the associated ride-height actuator;
    a locking pawl supported adjacent the driven gear for pivoting movement between a locked position engaged with a surface of the locking gear and restricting rotation thereof in at least the second direction and a disengaged position spaced apart from the locking gear and permitting rotation of the driven gear in at least the second direction; and
    a shifting fork coupled for rotation with the drive gear of the associated ride-height actuator;
    wherein the shifting fork is coupled with the locking pawl and configured to move the locking pawl between the engaged position and the disengaged position based at least in part on a direction of rotation of the driven gear; and
    wherein the shifting fork is coupled to the drive gear with a torque limiter that allows the shifting fork to rotate independent from the drive gear when a torque threshold is exceeded.

2. The locking mechanism according to claim 1, wherein the torque limiter includes a friction washer interposed between a surface of the shifting fork and the drive gear.

3. The locking mechanism according to claim 2, further comprising a torsion spring configured to bias the locking pawl towards the engaged position.

4. The locking mechanism according to claim 3, further comprising a one-way clutch disposed between the shifting fork and the driven gear, the one-way clutch configured to freewheel when the drive gear is rotated in the first direction and to transmit torque from the drive gear to the shifting fork when the drive gear is rotated in the second direction.

5. The locking mechanism according to claim 1, wherein the shifting fork includes a slot, and wherein the locking pawl is received in the slot.

6. The locking mechanism according to claim 1, wherein the locking gear includes a plurality of asymmetrical teeth having a major side and a minor side, and wherein the locking pawl engages the minor side of a tooth in the locked position.

7. The locking mechanism according to claim 6, wherein the major side of a tooth acts as a cam surface to force the locking pawl to the disengaged position when the driving gear is rotated in the first direction.

8. The locking mechanism of claim 1, wherein actuation of the locking mechanism is passive in response to rotation of the drive gear in the first and second directions.

9. A rotary vehicle ride-height actuator comprising:
    a drive gear;
    a driven gear coupled to the drive gear;
    a rotary to linear motion actuator coupled to the driven gear for increasing or decreasing the vehicle ride-height; and
    a locking mechanism for restricting decreasing the vehicle ride-height when engaged;
    wherein the drive gear is rotatable in a first direction to rotate the driven gear to raise vehicle ride-height and a second direction to rotate the driven gear to lower vehicle ride height, the locking mechanism including:
    a locking gear coupled for rotation with the driven gear of the associated ride-height actuator;
    a locking pawl supported adjacent the driven gear for pivoting movement between a locked position engaged with a surface of the locking gear and restricting rotation thereof in response to rotation of the drive gear in the second direction and a disengaged position spaced apart from the locking gear and permitting rotation of the driven gear in response to rotation of the drive gear in the second direction;
    a shifting fork coupled for rotation with the drive gear of the associated ride-height actuator;
    wherein the shifting fork is coupled with the locking pawl and configured to move the locking pawl between the engaged position and the disengaged position based at least in part on a direction of rotation of the driven gear; and
    wherein the shifting fork is coupled to the drive gear with a torque limiter that allows the shifting fork to rotate independent from the drive gear when a torque threshold is exceeded.

10. The rotary vehicle ride-height actuator of claim 9, wherein the torque limiter includes a friction washer interposed between a surface of the shifting fork and the drive gear.

11. The rotary vehicle ride-height actuator of claim 10, further comprising a torsion spring configured to bias the locking pawl towards the engaged position.

12. The rotary vehicle ride-height actuator of claim 11, further comprising a one-way clutch disposed between the shifting fork and the driven gear, the one-way clutch configured to freewheel when the drive gear is rotated in the first direction and to transmit torque from the drive gear to the shifting fork when the drive gear is rotated in the second direction.

13. The rotary vehicle ride-height actuator of claim 9, wherein the shifting fork includes a slot, and wherein the locking pawl is received in the slot.

14. The rotary vehicle ride-height actuator of claim 9, wherein the locking gear includes a plurality of asymmetrical teeth having a major side and a minor side, and wherein the locking pawl engages the minor side of a tooth in the locked position.

15. The rotary vehicle ride-height actuator of claim 14, wherein the major side of a tooth acts as a cam surface to force the locking pawl to the disengaged position when the driving gear is rotated in the first direction.

16. A rotary vehicle ride-height actuator comprising:
a drive gear having at least one and at most five teeth;
a driven gear coupled to the drive gear;
a rotary to linear motion actuator having a nut rotationally coupled to the driven gear for increasing or decreasing the vehicle ride-height; and
a locking mechanism for restricting decreasing the vehicle ride-height when engaged;
wherein the drive gear is rotatable in a first direction to rotate the driven gear to raise vehicle ride-height and a second direction to rotate the driven gear to lower vehicle ride height, the locking mechanism including:
a locking gear coupled for rotation with the driven gear of the associated ride-height actuator;
a locking pawl supported adjacent the driven gear for pivoting movement between a locked position engaged with a surface of the locking gear and restricting rotation thereof in response to rotation of the drive gear in the second direction and a disengaged position spaced apart from the locking gear and permitting rotation of the driven gear in response to rotation of the drive gear in the second direction; and
a shifting fork coupled for rotation with the drive gear of the associated ride-height actuator;
wherein the shifting fork is coupled with the locking pawl and configured to move the locking pawl between the engaged position and the disengaged position based at least in part on a direction of rotation of the driven gear; and
wherein the shifting fork is coupled to the drive gear with a torque limiter that allows the shifting fork to rotate independent from the drive gear when a torque threshold is exceeded.

17. The rotary vehicle ride-height actuator of claim 16, wherein the drive gear, the driven gear and the nut include helical gears.

18. The rotary vehicle ride-height actuator of claim 16, wherein the drive gear, the driven gear and the nut have mutually parallel rotates rotational axes.

19. The rotary vehicle ride-height actuator of claim 16, wherein the rotary to linear actuator includes a screw drive.

\* \* \* \* \*